United States Patent
Hong et al.

(10) Patent No.: US 9,162,179 B2
(45) Date of Patent: Oct. 20, 2015

(54) APPARATUS FOR DECOMPOSING PERFLUOROCARBON AND HARMFUL GAS USING HIGH-DENSITY CONFINED PLASMA SOURCE

(71) Applicant: TERATECH CO., LTD., Kongdo-eup, Anseong-si, Kyounggi-do (KR)

(72) Inventors: Jin Hong, Yongin-si (KR); Gi-Chung Kwon, Gwangju-si (KR)

(73) Assignee: TERATECH CO., LTD., Anseong-Si, Kyounggi-Do (KR)

( * ) Notice: Subject to any disclaimer, the term of this patent is extended or adjusted under 35 U.S.C. 154(b) by 0 days.

(21) Appl. No.: 14/190,678

(22) Filed: Feb. 26, 2014

(65) Prior Publication Data

US 2015/0196873 A1 Jul. 16, 2015

(30) Foreign Application Priority Data

Jan. 13, 2014 (KR) .................. 10-2014-0004072

(51) Int. Cl.
*B01D 53/32* (2006.01)

(52) U.S. Cl.
CPC ...................... *B01D 53/32* (2013.01)

(58) Field of Classification Search
CPC ........................................... B01D 53/32
See application file for complete search history.

(56) References Cited

U.S. PATENT DOCUMENTS

2005/0155854 A1* 7/2005 Shufflebotham et al. ..... 204/164
2007/0284242 A1* 12/2007 Moisan et al. ................ 204/165

FOREIGN PATENT DOCUMENTS

| JP | 2003117344 A | 4/2003 |
| JP | 2004533096 A | 10/2004 |
| KR | 100808979 B1 | 11/2000 |
| KR | 1020060001068 A | 1/2006 |
| KR | 1020060086398 A | 7/2006 |
| KR | 1020100110267 A | 10/2010 |
| KR | 1020110131833 A | 12/2011 |

* cited by examiner

*Primary Examiner* — Kishor Mayekar
(74) *Attorney, Agent, or Firm* — R. Neil Sudol; Henry D. Coleman (57) ABSTRACT

The present invention relates to an apparatus for decomposing perfluorocarbons and harmful gas using a high-density confined plasma source that includes: a reactor having inlet and outlet ports formed in the top and bottom sides thereof for receiving and discharging perfluorocarbons and harmful gas, a chamber having an internal passage, a ferrite core formed outside of the chamber and connected to an antenna, and a permanent magnet arranged around the ferrite core; a gas supply portion for supplying a gas for decomposing the perfluorocarbons and harmful gas into the reactor; and a generator and a controller for supplying electric power for the antenna of the reactor.

19 Claims, 6 Drawing Sheets

APPARATUS FOR DECOMPOSING PERFLUOROCARBON AND HARMFUL GAS USING HIGH-DENSITY CONFINED PLASMA SOURCE

CROSS-REFERENCE TO RELATED APPLICATIONS

This application is based on and claims priority from Korean Patent Application No. 10-2014-0004072 filed on Jan. 13, 2014 in the Korean Intellectual Property Office, the disclosure of which is incorporated herein in its entirety by reference.

BACKGROUND OF THE INVENTION

1. Field of the Invention

The present invention relates to an apparatus for decomposing perfluorocarbons and harmful gas using a high-density confined plasma source, and more particularly, to an apparatus for decomposing perfluorocarbons (PFCs) and harmful gas using a high-density confined plasma source that is to decompose and eliminate perfluorocarbons (PFCs) used as a processing gas for dry etching of insulators in semiconductor fabrication processes.

2. Background of the Related Art

Generally, perfluorocarbons (PFCs), known as one of greenhouse gases that contribute to global warming, are used as a processing gas for dry etching of insulators in semiconductor fabrication processes.

Perfluorocarbons (PFCs) consumed incompletely and emitted in the atmosphere from the chamber after completion of the semiconductor fabrication processes are subjected to environmental regulations and thus required to decompose prior to their release to the atmosphere. For this purpose, a variety of scrubbers are used.

Korean Patent No. 10-0808979 discloses a patented technique for "processing fluorocarbon sources".

The prior art describes a technique that includes: generating an electrical arc between at least one negative electrode and at least one positive electrode in a high temperature region; generating thermal plasma having a tail-shaped flame burning upward with the electrical arc and a plasma gas in the high temperature region; forming a reactive thermal mixture from a solid particle fluorocarbon source including at least one fluorocarbon under the tail-shaped flame of the thermal plasma to dissociate the fluorocarbon compound into at least one fluorocarbon precursor or reactive species; and cooling down the reactive thermal mixture to form at least one desired fluorocarbon compound from the fluorocarbon precursor or reactive species.

Out of the prior art, a burn & wet type scrubber using heat and liquids is widely used in the fields of semiconductor, but it is likely to generate $NO_x$ gases at high temperature for decomposition of perfluorocarbons, where the release of $NO_x$ is also banned. Reducing the temperature to prevent this problem adversely ends up with unsatisfactory efficiency of the perfluorocarbon decomposition.

Further, a scrubber using another plasma involves in consuming high electric powder to achieve high decomposition efficiency or, when installed in an exhaust pipe, causes erosion of the exhaust pipe or damage on the pump.

Figure 1:
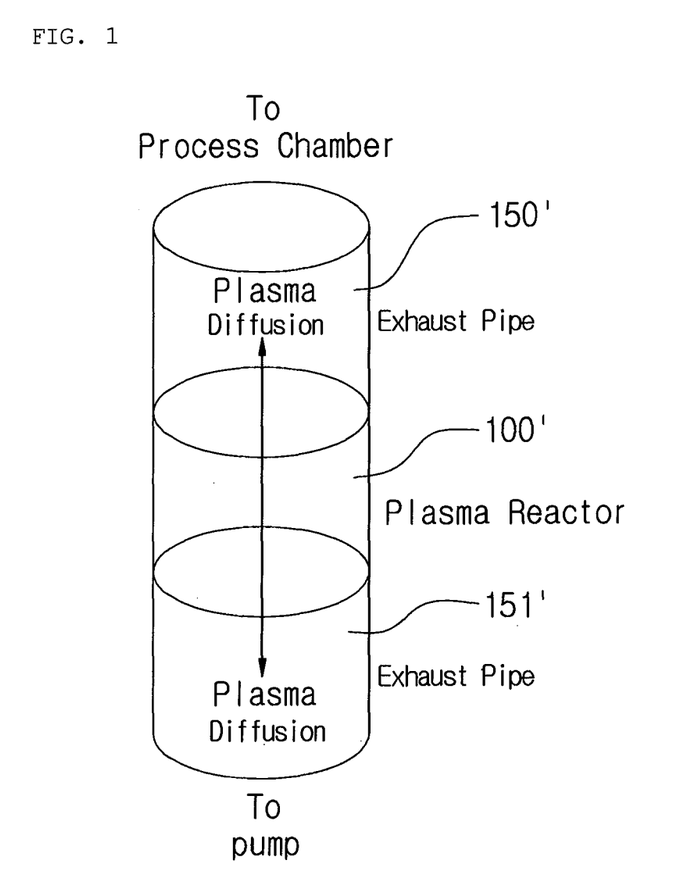
FIG. 1 is an illustration of the prior art.

When using a plasma, the straight line arrangement of exhaust pipes 150' and 151' connected to the top and bottom portions of reactors 150, as illustrated in FIG. 1, causes the plasma to diffuse up and down, accordingly leading to erosion of the exhaust pipe 150' and damage on the pump. This also decreases the density of plasma to reduce the decomposition efficiency.

SUMMARY OF THE INVENTION

In an attempt to eliminate the problems with the above-described prior art, it is an object of the present invention to provide an apparatus for decomposing perfluorocarbons and harmful gas using a high-density confined plasma source, which apparatus is designed to use the plasma confining techniques to enhance the perfluorocarbon decomposition efficiency at low electric power and improve the diffusion of plasma, extending its applicability to large-aperture exhaust pipes, and also to construct a donut-shaped reactor in the exhaust pipes to confine plasma using the magnetic field and the inductive coupling plasma, thereby increasing the decomposition efficiency for the perfluorocarbons and harmful gases in large-aperture exhaust pipes.

To accomplish the above object of the present invention, there is provided an apparatus for decomposing perfluorocarbons (PFCs) and harmful gas that includes: a reactor having inlet and outlet ports formed in the top and bottom sides thereof for receiving and discharging perfluorocarbons and harmful gas, a chamber having an internal passage, a ferrite core formed outside of the chamber and connected to an antenna, and a permanent magnet arranged around the ferrite core; a gas supply portion for supplying a gas for decomposing the perfluorocarbons and harmful gas into the reactor; and a generator and a controller for supplying electric power for the antenna of the reactor.

The internal passage of the chamber has a donut shape.

The electric power supplied for the antenna has a frequency of 200 to 600 kHz.

On either side of the chamber are arranged at least two of the ferrite cores.

The permanent magnets are coupled to a frame formed on the top and bottom sides of the ferrite core and have a cylindrical or rod-like shape.

The permanent magnets are inserted in a hole formed in the inner wall of the chamber.

The permanent magnets are arranged to form a magnetic field in the direction of the passage of the chamber penetrating the ferrite core.

The permanent magnets on the top and bottom sides of the ferrite core are arranged to form a magnetic field in a same or opposite direction with each other.

The intensity of the magnetic field is at least 1,000 G per one permanent magnet.

The apparatus further includes: an inductive coupling plasma antenna mounted on the inlet and outlet ports of the reactor for inducing an inductive coupling plasma to do plasma confinement.

The antenna is connected to an antenna wound around the ferrite core and operated in a simultaneous manner.

A permanent magnet is inserted in the inlet and outlet ports of the reactor to do plasma confinement using the magnetic field, thereby preventing the diffusion of plasma.

The permanent magnet is arranged to form the magnetic field in the direction of the inlet and outlet ports.

On the top rear side of the reactor is formed an igniter, which generates an initial discharge using the CCP.

On the top front side of the reactor is formed a viewport to monitor the state of plasma.

The reactor has a plasma cooling device.

The plasma cooling device has a cooling water passage formed inside the wall of the chamber and a cooling water feeding portion formed outside the wall of the chamber.

The material for the chamber is any one selected from quartz, aluminum oxide ($Al_2O_3$), SUS, and anodized aluminum.

The apparatus further includes a DC break inserted as an insulating means having an insulator function for separating the top and bottom portions of the chamber, when the material for the chamber is a conductor.

The apparatus further includes a process chamber connected to the inlet port of the reactor, and a dry pump connected to the outlet port of the reactor.

The decomposing gas supplied from the gas supply portion is any one selected from the group consisting of argon, helium, water vapor, oxygen, methane, ammonia, and a mixture of at least two thereof.

Conventionally, the diffusion of plasma occurs along the exhaust pipes when using a straight-line plasma reactor in the exhaust pipes having a diameter of 10 cm or greater. In contrast, the present invention forms a high-density plasma using ferrite cores and the magnetic field in a reactor having a donut-shaped loop and confines the plasma using the inductive coupling plasma (ICP) and the magnetic field to prevent the diffusion of plasma, thereby enhancing the decomposition efficiency for the gas such as perfluorocarbons (PFCs).

In addition, the present invention can decrease or increase the density of plasma by changing the outer shape of the reactor and the arrangement and the number of ferrite cores and permanent magnets and control the intensity of plasma confinement by changing the number of winding turns of an inductive coupling plasma antenna and the number of permanent magnets inserted in the inlet and outlet ports of the reactor and the chamber body, thereby easily handling with the exhaust pipes of various sizes and achieving gas decomposition.

DETAILED DESCRIPTION OF THE PREFERRED EMBODIMENT

Hereinafter, preferred embodiments of the present invention will be described in detail as follows.

Figure 2:
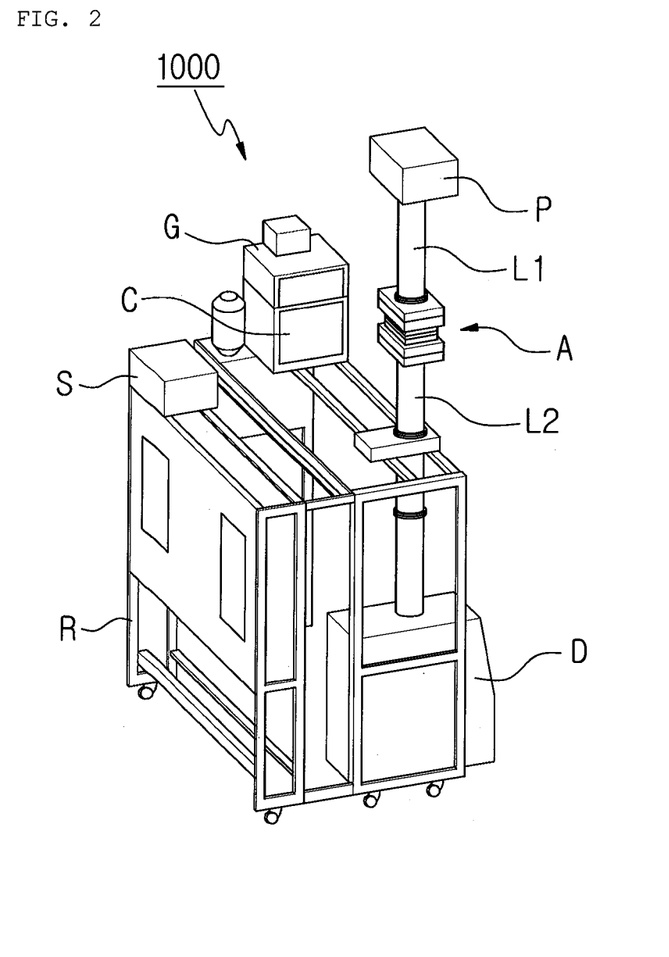
FIG. 2 is a perspective view showing an apparatus for decomposing perfluorocarbons and harmful gas according to the present invention.
Figure 3:
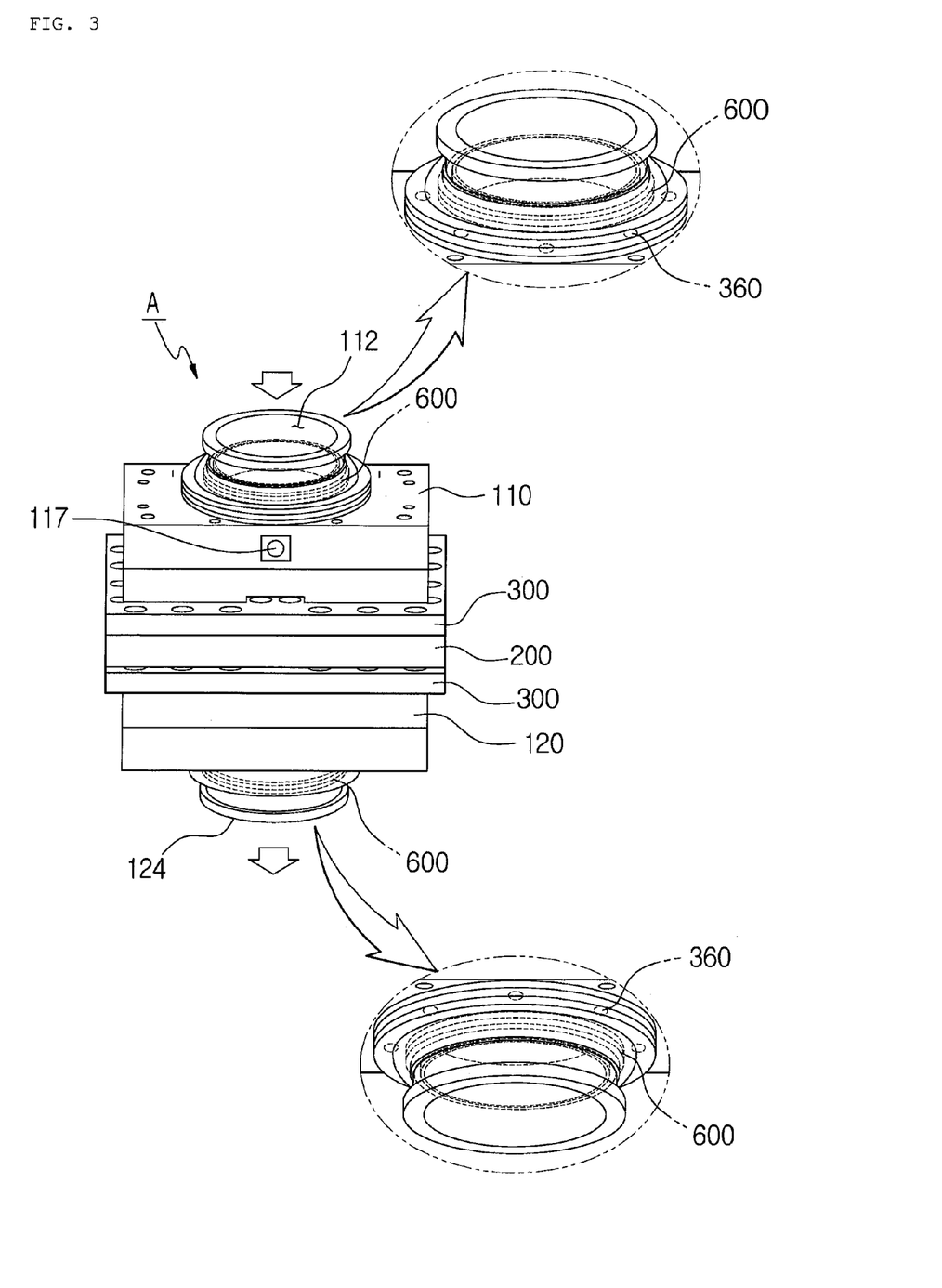
FIG. 3 is an enlarged perspective view showing a reactor of FIG. 2.
Figure 4:
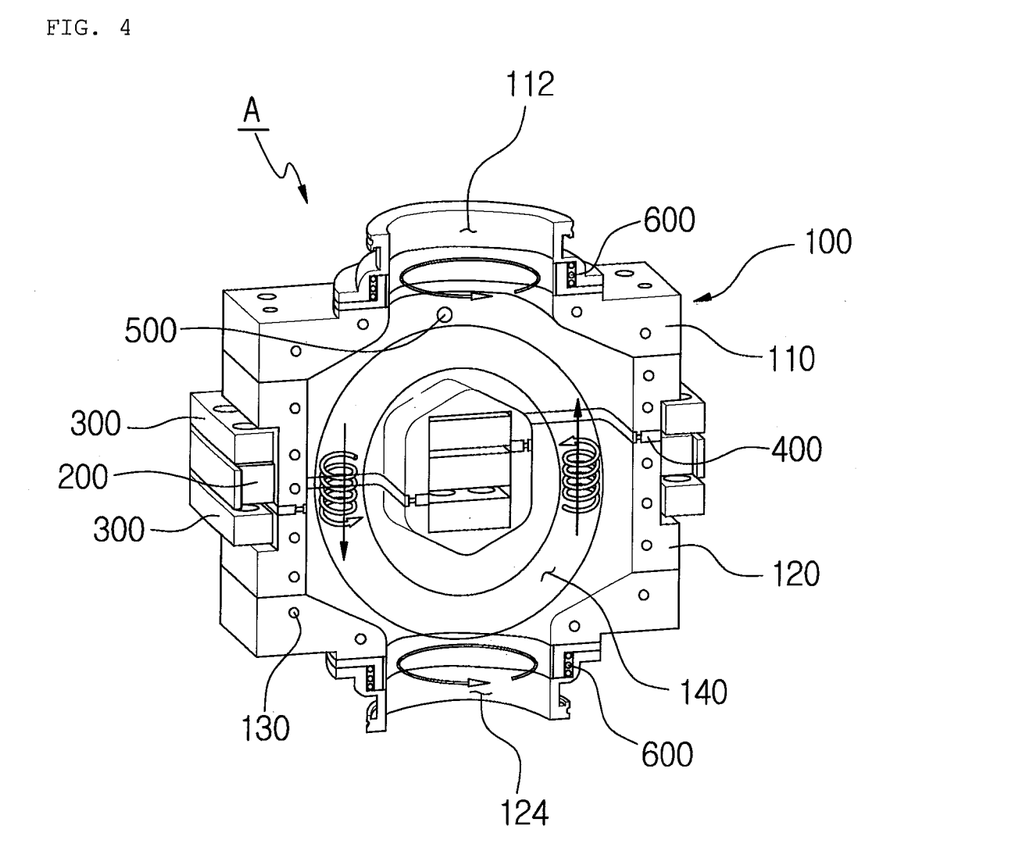
FIG. 4 is a cross-sectional view showing the reactor of FIG. 3.
Figure 5:
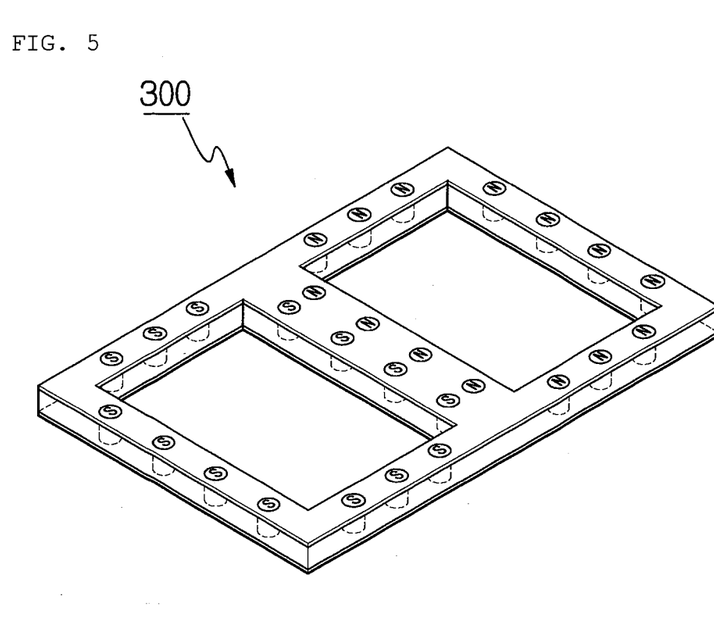
FIG. 5 is a perspective view showing a permanent magnet and a frame applied to the top and bottom of a ferrite core of FIGS. 3 and 4.

As for the accompanying drawings, FIG. 2 is a perspective view showing an apparatus for decomposing perfluorocarbons and harmful gas according to the present invention; FIG. 3 an enlarged perspective view showing a reactor of FIG. 2; FIG. 4 a cross-sectional view showing the reactor of FIG. 3; FIG. 5 a perspective view showing a permanent magnet and a frame applied to the top and bottom of a ferrite core of FIGS. 3 and 4.

As illustrated in FIGS. 2 to 5, a plasma apparatus for decomposing perfluorocarbons according to the present invention is largely comprised of a reactor A into which perfluorocarbons are fed, a gas feeding portion S for supplying a decomposing gas for the reactor A, and a generator G and a controller for supplying electric power for the reactor A.

The reactor A includes inlet and outlet ports 112 and 124 formed on the top and bottom sides to receive and exhaust perfluorocarbons and harmful gas; a chamber 100 having an internal passage; a ferrite core 200 formed outside the chamber 100, the ferrite core 200 having an antenna connected to an antenna 600 for generating an inductive coupling plasma; and a frame 300 having a permanent magnet and being arranged around the ferrite core 200.

The chamber 100 is shaped like a donut, as the imaginary shape of the plasma generated inside the chamber is a loop.

The material for the chamber 100 is any one selected from quartz, aluminum oxide ($Al_2O_3$), SUS, and anodized aluminum.

In this regard, when the material for the chamber 100 is used as a conductor, the chamber 100 is divided into upper and lower chambers 110 and 120. Between the upper and lower chambers 110 and 120 is inserted a DC break 400 that is an insulating means having an insulator function.

The DC break 400 is a kind of insulator that functions to transfer the power from the generator to the perfluorocarbon gas without a power loss on the wall of the chamber 100 of which the material is a conductor.

The power source supplied for the antenna 600 has a frequency of 200 to 600 kHz.

At least two of the ferrite cores 200 are arranged on either side (left or right) of the chamber 100.

The permanent magnet is coupled to the frame 300 formed on the top and bottom sides of the ferrite core 200 and has a cylindrical or rod-like shape.

As illustrated in FIG. 5, the permanent magnet is provided in the form of a grid. One end of the permanent magnet is the north pole, and the opposite end is the south pole.

In an alternative way, the permanent magnet may be inserted into a hole formed in the inner wall of the chamber 100.

Such a permanent magnet is arranged so that its magnetic field is formed in the direction of the passage of the chamber 100 penetrating the ferrite core 200.

The permanent magnets on the top and bottom sides of the ferrite core 200 are arranged to form the magnetic filed in the same direction or the opposite direction.

The intensity of the magnetic field is preferably at least 1,000 G per permanent magnet.

On the other hand, the inductive coupling plasma antenna 600 is provided in the form of a ring wound around the inlet and outlet ports 112 and 124 of the reactor A.

The inductive coupling plasma antenna 600 induces an inductive coupling plasma to do plasma confinement.

The antenna 600 is connected to the antenna 600 wound around the ferrite core 200 and operated in a simultaneous manner.

The inlet and outlet ports 112 and 124 of the chamber body have a hole into which a permanent magnet 360 is inserted.

The magnetic field generated from the permanent magnet 360 functions to confine the plasma other than the inductive coupling plasma.

The permanent magnet 360 is preferably arranged to form the magnetic field in the direction of the inlet and outlet ports 112 and 124.

In the top rear side of the reactor A is formed an igniter 500, which is to cause an initial discharge using the CCP.

In the top front side of the reactor A is formed a viewport 117 to monitor the state of plasma.

The reactor A has a plasma cooling device.

The plasma cooling device has a cooling water passage 130 formed inside the wall of the chamber 100, and a cooling water feeding portion (not shown) formed outside the wall of the chamber 100.

This structure enables the cooling water to circulate through the cooling water passage 130 and thereby achieves water cooling.

The inlet port 112 of the reactor A is connected to a process chamber 100, and the outlet port 124 of the reactor A is connected to a dry pump D.

Preferably, an exhaust pipe L2 connected to the dry pump D has a diameter of 50 to 250 mm.

The gas feeing portion S has an inlet port (not shown) formed at a position apart from the inlet port 112 of the reactor A to supply a gas for decomposing perfluorocarbons and harmful gas. The gas supplied is any one selected from argon (Ar) helium (He), water vapor, oxygen, methane, ammonia, or a mixture of at least two.

Also, a generator G is provided to supply electric power for the antenna 600 connected to the ferrite core 300 and the inlet and outlet ports 112 and 124 of the reactor A.

One generator G is provided for both the transformer coupling plasma (TCP) and the inductive coupling plasma (ICP); or at least two generators are provided independently for the transformer coupling plasma (TCP) and the inductive coupling plasma (ICP).

The gas decomposition process of the apparatus for decomposing perfluorocarbons and harmful gas according to the present invention is synchronized with a main process of the process chamber.

An association example of the present invention as constructed above can be described as follows.

The ferrite core 200 is arranged on both sides (left and right) of the donut-shaped reactor A having a loop and connected to the antenna 600 to generate the transformer coupling plasma (TCP).

In addition, a same antenna 600 is wound around the inlet and outlet ports 112 and 124 of the reactor A to induce the inductive coupling plasma (ICP).

The frame 300 with a permanent magnet is coupled to the top and bottom sides of the ferrite core 200 that is arranged on either side of the reactor A. The inlet and outlet ports 112 and 124 of the chamber body are provided with a hole, into which the permanent magnet 360 is inserted.

In such a construction, the power transferred to the antenna 600 connected to the ferrite core 200 causes the transformer coupling plasma to generate. The electric field is induced in the straight-line direction penetrating the ferrite core 200 so that electrons go around the loop-shaped chamber 100 in the reactor according to the direction of the electric field to form a plasma 140.

The magnetic field generated from the permanent magnet of the frame 300 coupled to the top and bottom sides of the ferrite core 200 changes the straight-line motion of the electrons into the helical motion. This increases the path of the electrons and the density of the plasma, ending up enhancing the gas decomposition efficiency.

As shown in FIG. 3, a permanent magnet having a cylindrical shape can be inserted into the frame 300 made of a material not affecting the magnetic field and thus coupled to the reactor. Otherwise, a cylindrical or rod-like permanent magnet is inserted into a hole formed in the body of the reactor A to form the magnetic field.

The permanent magnet 360 attached to the inlet and outlet ports 112 and 124 of the reactor A generates the magnetic field to confine the motion of electrons other than the inductive coupling plasma. This can enhance the prevention of the plasma diffusion.

When the material for the reaction A is a conductor such as aluminum, it is subjected to the full anodizing process to enhance the plasma resistance and provided with a DC break inserted to have an insulator function between the top and bottom sides of the reactor A.

In the top rear side of the reactor A that is the gas-receiving portion is formed a separate igniter for inducing an initial plasma discharge using the CCP. In the top front side of the reactor A is provided a viewport to monitor the state of plasma.

Cooling water is flowed through the cooling water passage 130 formed inside the reactor A to cool down the heat generated during the formation of plasma.

An apparatus 1000 for decomposing perfluorocarbons and harmful gas as equipped with the above-constructed reactor has the reactor A mounted on exhaust pipes L1 and L2 between the process chamber P and the dry pump D. The apparatus also has a gas inlet port formed at a position apart from the inlet port 112 for fluorocarbons and harmful gas to receive the gas from a gas supply device S installed in a dry pump rack R.

The dry pump rack R includes a controller C for synchronizing the main process of the process chamber with the operation of the gas decomposing apparatus, an additional gas supply device for gas decomposition, and a generator G for supplying electric power.

The input gas is an inert gas, such as argon (Ar) or helium (He), for initial ignition, and the gas for decomposition of harmful gas further includes argon (Ar), evaporated water, oxygen/hydrogen-containing ammonia, or methane.

Argon (Ar) emits electrons through ionization in the plasma, and the electrons generated collide with perfluorocarbons to decompose the gas.

The evaporated water ($H_2O$) collide with electrons in the plasma to form radicals according to the mechanism given by "$H_2O \rightarrow OH+H$". The hydroxyl radical (OH), as an oxidizer stronger than oxygen (O), reacts with the perfluorocarbon to form fluorine (F) ($CxFy+OH \rightarrow COH+F$).

The fluorine released from the perfluorocarbon reacts with hydrogen to form hydrogen fluoride (HF), which is released in the gaseous state ($F+H \rightarrow HF$).

The gas containing hydrogen (H), such as methane ($CH_4$) collides with electrons in the plasma to form a hydrogen radical ($CH_4 \rightarrow CHx+H$). This hydrogen radical acts as an F scavenger to decompose perfluorocarbons PFCs according to the mechanism reaction given by $CxFy+H \rightarrow C+HF$.

Besides, an addition of ammonia ($NH_3$) can also have the similar effect.

Figure 6:
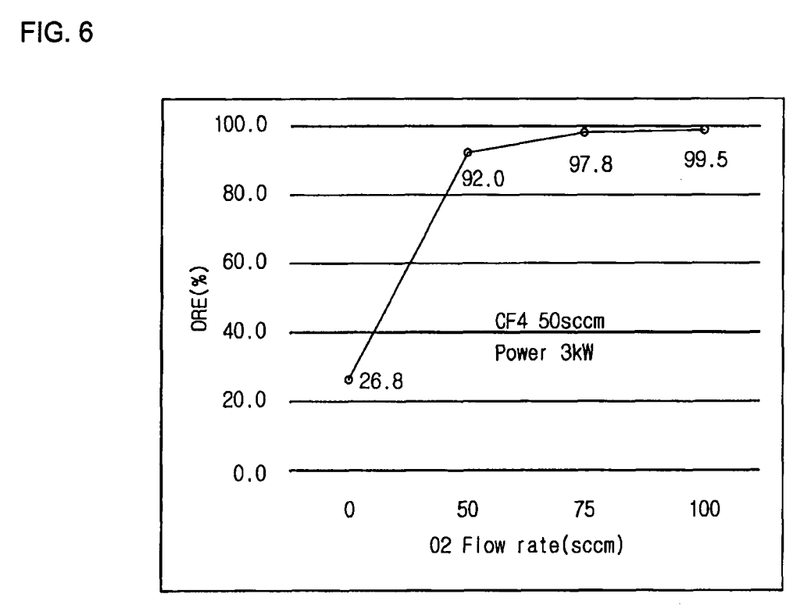
FIGS. 6 and 7 are graphs showing results of FTIR analysis on the decomposition products of methane ($CF_4$) gas using oxygen plasma in an plasma apparatus of the present invention.
Figure 7:
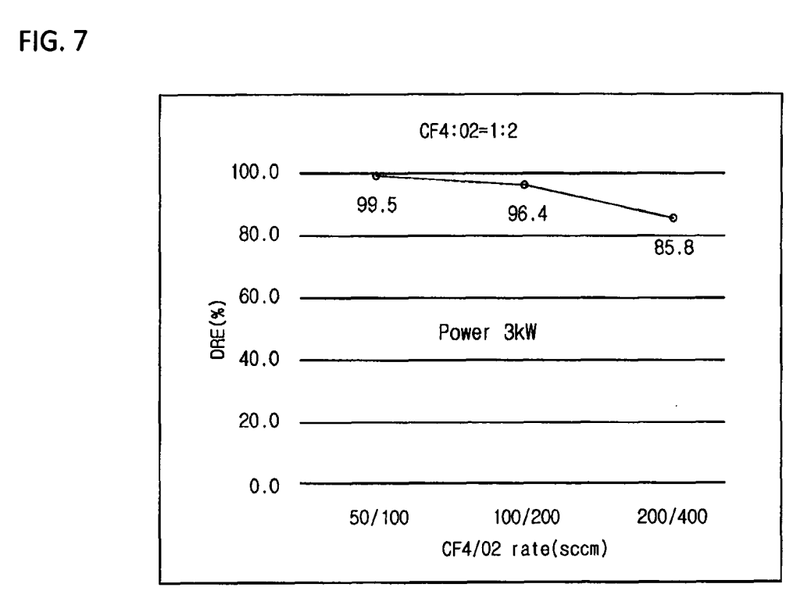

FIGS. 6 and 7 present the results of the FTIR analysis on the decomposition products of methane ($CF_4$) gas using the oxygen plasma in the plasma apparatus of the present invention, where methane is known as a perfluorocarbon compound known to be most difficult to decompose among the perfluorocarbons.

Referring to FIG. 6, the decomposition efficiency is 26.8% when methane is decomposed alone; but it increases up to 99.5% when methane is decomposed with an addition of oxygen ($O_2$). This explicitly shows the fact that a gaseous chemical reaction given by "$CF_4+O \rightarrow CO/CO_2$" occurs actively in the plasma.

Referring to FIG. 2, when the ratio of $CF_4/O_2$ is maintained at 1:2, it is possible to achieve the decomposition efficiency of 85% (up to 200 sccm of $CF_4$), which result is hard to acquire with the use of a scrubber that is another decomposing apparatus.

As shown in FIGS. 6 and 7, the input power of the generator for the decomposition is no more than 3 kW, which is such a low power but leads to the remarkable results as mentioned above. This is the consequential achievement of the specialized technologies concerning plasma confinement and high-density plasma in the reactor A as suggested by the present invention.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

DESCRIPTION OF SYMBOLS

100: CHAMBER
110: UPPER CHAMBER
120: LOWER CHAMBER
130: COOLING WATER PASSAGE
140: DONUT-SHAPED PLASMA
200: FERRITE CORE
300: PERMANENT MAGNET FRAME
400: DC BREAK
500: IGNITER
600: ANTENNA
D: DRY JUMP
C: CONTROLLER
S: GAS SUPPLY PORTION
G: GENERATOR

What is claimed is:

1. A perfluorocarbon decomposing apparatus comprising:
a reactor having inlet and outlet ports, a chamber body, at least one ferrite core, and at least one permanent magnet, the inlet and outlet ports being formed in top and bottom sides of the reactor for receiving and discharging perfluorocarbons and harmful gas, the chamber body having an internal passage, the at least one ferrite core being formed outside of the chamber body and connected to an antenna, the at least one permanent magnet being arranged around the at least one ferrite core;
a gas supply portion for supplying a gas for decomposing the perfluorocarbons and harmful gas into the reactor; and
a generator and a controller for supplying electric power to the antenna of the reactor.

2. The perfluorocarbon decomposing apparatus as claimed in claim 1, wherein the internal passage of the chamber has a loop shape, and wherein the chamber has a donut shape.

3. The perfluorocarbon decomposing apparatus as claimed in claim 1, wherein the reactor has a plurality of ferrite cores, at least two of the ferrite cores being arranged on different sides of the chamber body.

4. The perfluorocarbon decomposing apparatus as claimed in claim 1, wherein the reactor has a plurality of permanent magnets coupled to a frame formed on top and bottom sides of the at least one ferrite core and having a cylindrical or rod shape.

5. The perfluorocarbon decomposing apparatus as claimed in claim 4, wherein the at least one permanent magnet is arranged to form a magnetic field penetrating the at least one ferrite core in the direction of the passage of the chamber body.

6. The perfluorocarbon decomposing apparatus as claimed in claim 1, wherein the at least one permanent magnet is inserted in a hole formed in an inner wall of the chamber body.

7. The perfluorocarbon decomposing apparatus as claimed in claim 6, wherein the at least one permanent magnet is arranged to form a magnetic field penetrating the at least one ferrite core in the direction of the passage of the chamber body.

8. The perfluorocarbon decomposing apparatus as claimed in claim 1, wherein the reactor has a plurality of permanent magnets on top and bottom sides of the at least one ferrite core, the permanent magnets being arranged to form a magnetic field in a same or opposite direction with each other.

9. The perfluorocarbon decomposing apparatus as claimed in claim 8, wherein the intensity of the magnetic field is at least 1,000 G per one permanent magnet.

10. The perfluorocarbon decomposing apparatus as claimed in claim 1 wherein the antenna is a first antenna, further comprising:
a second antenna in the form of an inductive coupling plasma antenna mounted on the inlet and outlet ports of the reactor for inducing an inductive coupling plasma to do plasma confinement.

11. The perfluorocarbon decomposing apparatus as claimed in claim 10, wherein the first antenna is wound around the at least one ferrite core and wherein the second antenna is connected to the first antenna and configured to operate in a simultaneous manner.

12. The perfluorocarbon decomposing apparatus as claimed in claim 1, wherein an igniter is formed on a top rear side of the reactor, the igniter using capacitively coupled plasma to cause an initial discharge.

13. The perfluorocarbon decomposing apparatus as claimed in claim 1, wherein the reactor has a plasma cooling device.

14. The perfluorocarbon decomposing apparatus as claimed in claim 13, wherein the plasma cooling device has a cooling water passage formed inside a wall of the chamber body and a cooling water feeding portion formed outside the wall of the chamber body.

15. The perfluorocarbon decomposing apparatus as claimed in claim 1, further comprising a direct current break as an insulating means having an insulator function for separating top and bottom portions of the chamber body, when a material for the chamber body is a conductor.

16. The perfluorocarbon decomposing apparatus as claimed in claim 1, wherein the apparatus further comprises a process chamber connected to the inlet port of the reactor, and a dry pump connected to the outlet port of the reactor.

17. The perfluorocarbon decomposing apparatus as claimed in claim 1, wherein the decomposing gas supplied from the gas supply portion is any one selected from the group consisting of argon, helium, water vapor, oxygen, methane, ammonia, and a mixture of at least two thereof.

18. The perfluorocarbon decomposing apparatus as claimed in claim 1, wherein at least one additional permanent magnet is inserted in at least one of the inlet and outlet ports.

19. The perfluorocarbon decomposing apparatus as claimed in claim 18, wherein the at least one additional permanent magnet is arranged to form a magnetic field in the direction of the inlet and outlet ports.

* * * * *